US012663647B2

(12) United States Patent
Fu et al.

(10) Patent No.: US 12,663,647 B2
(45) Date of Patent: Jun. 23, 2026

(54) METALENS STACK ON WAVEGUIDE COMBINERS FOR AR/VR GLASSES

(71) Applicant: Applied Materials, Inc., Santa Clara, CA (US)

(72) Inventors: Jinxin Fu, Fremont, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 214 days.

(21) Appl. No.: 18/280,901

(22) PCT Filed: Mar. 7, 2022

(86) PCT No.: PCT/US2022/019157
§ 371 (c)(1),
(2) Date: Sep. 7, 2023

(87) PCT Pub. No.: WO2022/192142
PCT Pub. Date: Sep. 15, 2022

(65) Prior Publication Data
US 2024/0151973 A1 May 9, 2024

Related U.S. Application Data

(60) Provisional application No. 63/158,665, filed on Mar. 9, 2021.

(51) Int. Cl.
*G02B 27/01* (2006.01)
*G02B 1/00* (2006.01)
(Continued)

(52) U.S. Cl.
CPC ......... *G02B 27/0172* (2013.01); *G02B 1/002* (2013.01); *G02B 3/0062* (2013.01);
(Continued)

(58) Field of Classification Search
CPC .. G02B 27/0172; G02B 1/002; G02B 3/0062; G02B 5/1819; G02B 27/106; G02B 2027/0178; G02B 2207/101
(Continued)

(56) References Cited

U.S. PATENT DOCUMENTS

2006/0245052 A1 11/2006 Wilt et al.
2018/0284460 A1 10/2018 Cheng et al.
(Continued)

FOREIGN PATENT DOCUMENTS

CN     112041716 A    12/2020
TW      I665481 B     7/2019

OTHER PUBLICATIONS

International Search Report and Written Opinion dated Jun. 27, 2022 for Application No. PCT/US2022/019157.
(Continued)

*Primary Examiner* — William Choi
(74) *Attorney, Agent, or Firm* — Patterson + Sheridan, LLP

(57) ABSTRACT

Embodiments of the present application generally relate to augmented reality and virtual reality glasses having stacked lenses. The augmented reality (AR) and virtual reality (VR) glasses includes a pair of lenses retained by a frame. A lens stack is utilized in the pair of lenses. The lens stack may include multiple metasurfaces that improve the focus adjustment for both the real and virtual images as well as a prescription lens or prescription metasurface in the lens stack. The metasurfaces are coupled to a waveguide combiner to assist in overlaying virtual images on ambient environments. By utilizing a lens stack, the total weight of the glasses will decrease.

19 Claims, 6 Drawing Sheets

100

(51) Int. Cl.
    *G02B 3/00*         (2006.01)
    *G02B 5/18*         (2006.01)
    *G02B 27/10*       (2006.01)

(52) U.S. Cl.
    CPC ......... *G02B 5/1819* (2013.01); *G02B 27/106*
        (2013.01); *G02B 2027/0178* (2013.01); *G02B*
                                *2207/101* (2013.01)

(58) Field of Classification Search
    USPC .......................................... 359/630; 345/7–9
    See application file for complete search history.

(56) References Cited

U.S. PATENT DOCUMENTS

| | | |
|---|---|---|
| 2019/0129178 A1 | 5/2019 | Patterson et al. |
| 2019/0302358 A1 | 10/2019 | Lin et al. |
| 2020/0271941 A1 | 8/2020 | Riley, Jr. et al. |
| 2020/0379184 A1 | 12/2020 | Vora |

OTHER PUBLICATIONS

Taiwanese Office Action for Application No. 111108532 dated Nov. 26, 2025.

METALENS STACK ON WAVEGUIDE COMBINERS FOR AR/VR GLASSES

BACKGROUND

Field

Embodiments of the present disclosure generally relate to optical devices. More specifically, embodiments described herein relate to augmented reality and virtual reality glasses having stacked lenses.

Description of the Related Art

Virtual reality (VR) is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality (AR), however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is efficiently and cost effectively manufacturing VR and AR glasses. In addition to an optical device, such as a waveguide combiner to assist in overlaying virtual images on ambient environments, the VR and AR glasses may utilize additional lenses to focus the virtual image. Therefore, a multiple lens arrangement may be employed for the VR and AR glasses such that the virtual image plane is closer to the retina of the user's eye and such that a real image is focused. The multiple lenses of the arrangement may be spaced apart in the VR and AR glasses which can lead to a heavy and bulky form factor. The multiple lens arrangement may also use a post alignment process to align the multiple lenses, thus increasing manufacturing time and cost. Additionally, users who require prescription eyeglasses should account for their eyeglasses when wearing the VR and AR glasses, leading to an uncomfortable user experience. Accordingly, what is needed in the art are augmented reality and virtual reality glasses having stacked lenses.

SUMMARY

In one embodiment, an optical device is provided. The optical device includes a first waveguide combiner. The first waveguide combiner includes a first plurality of gratings disposed on a first surface of a substrate and a second plurality of gratings disposed on a second surface of the substrate. The optical device includes a first encapsulation layer disposed on the first plurality of gratings and a second encapsulation layer disposed on the second plurality of gratings. The optical device further includes a first metasurface coupled to the first encapsulation layer. The first metasurface includes a first plurality of optical device structures. The optical device further includes a second metasurface coupled to the second encapsulation layer. The second metasurface includes a second plurality of optical device structures.

In another embodiment, an optical device is provided. The optical device includes a waveguide combiner. The waveguide combiner includes a first plurality of gratings disposed on a first surface of a substrate and a second plurality of gratings disposed on a second surface of the substrate. The optical device further includes a first metasurface coupled to the first plurality of gratings. The first metasurface includes a first plurality of optical device structures disposed on a first substrate. The optical device further includes a second metasurface coupled to the second plurality of gratings. The second metasurface includes a second plurality of optical device structures disposed on a second substrate.

In yet another embodiment, an optical device is provided. The optical device includes a waveguide combiner. The waveguide combiner includes a first plurality of gratings disposed on a first surface of a substrate and a second plurality of gratings disposed on a second surface of the substrate. The optical device further includes a convex lens coupled to the first plurality of gratings with a first pair of spacers and a concave lens coupled to the second plurality of gratings with a second pair of spacers.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to optical devices. More specifically, embodiments described herein relate to augmented reality and virtual reality glasses having stacked lenses. In one embodiment, an optical device is provided. The optical device includes a first waveguide combiner. The first waveguide combiner includes a first plurality of gratings disposed on a first surface of a substrate and a second plurality of gratings disposed on a second surface of the substrate. The optical device includes a first encapsulation layer disposed on the first plurality of gratings and a second encapsulation layer disposed on the second plurality of gratings. The optical device further includes a first metasurface coupled to the first encapsulation layer. The first metasurface includes a first plurality of optical device structures. The optical device further includes a second metasurface coupled to the second encapsulation layer. The second metasurface includes a second plurality of optical device structures.

Figure 1:
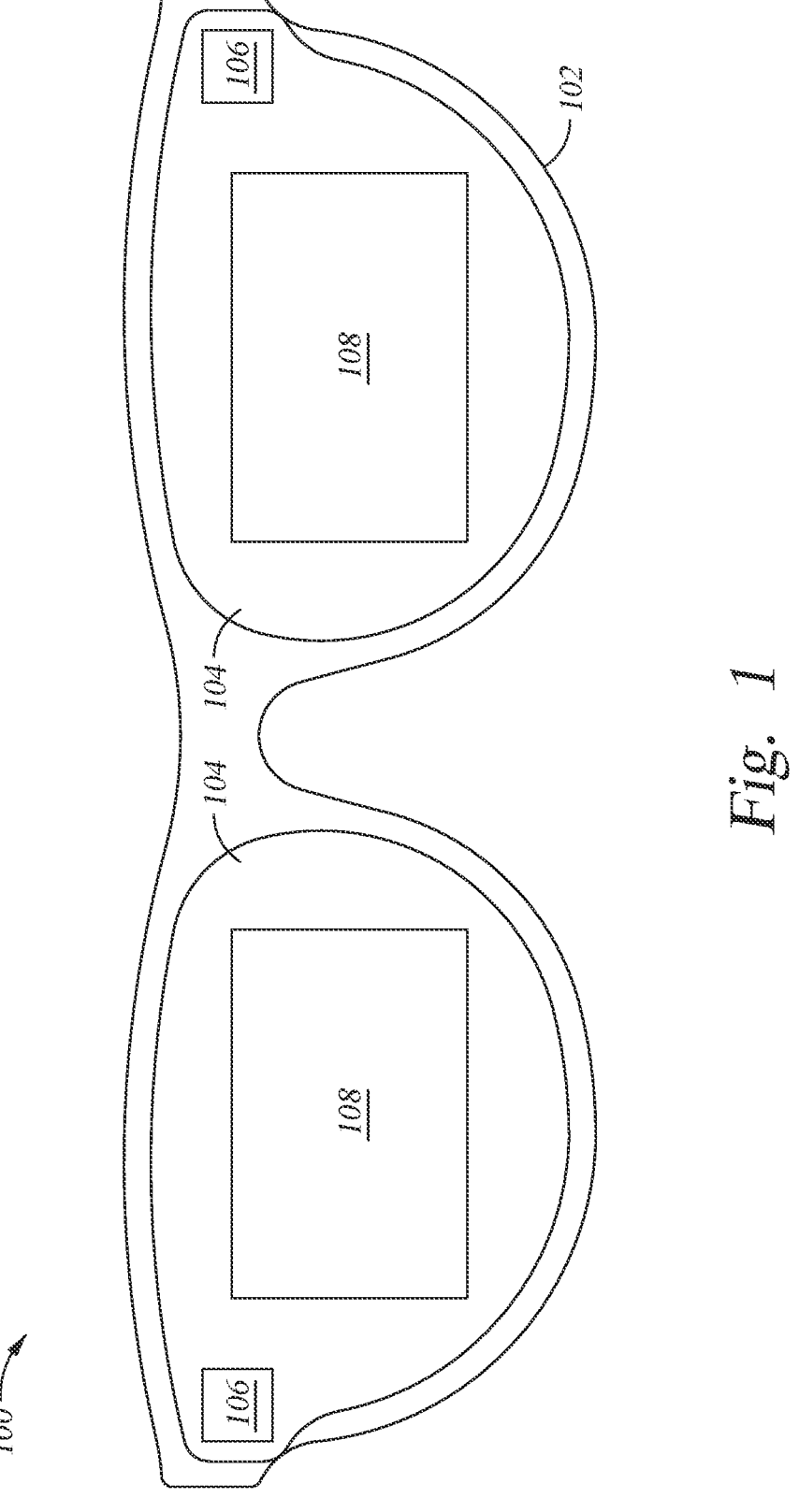
FIG. 1 is a schematic, frontal view of glasses according to embodiments.

FIG. 1 is a schematic, frontal view of glasses 100. The glasses 100 are operable to be virtual reality (VR) or augmented reality (AR) glasses. The glasses 100 include a frame 102. The frame 102 retains a pair of optical device lenses 104. Each lens of the pair of optical device lenses 104 includes an image incoupler 106 and an image outcoupler 108. In one embodiment, which can be combined with other embodiments described herein, the image incoupler 106 and the image outcoupler 108 are arranged so as to achieve substantially total internal reflection of light between the image incoupler 106 and the image outcoupler 108. In another embodiment, which can be combined with other embodiments described herein, each lens of the pair of optical device lenses 104 includes one of a lens stack 200A-200E (shown in FIGS. 2A-2E). The lens stacks 200A-200E include multiple lenses (shown in FIGS. 2A-2E) that are physically coupled together such that the pair of optical device lenses 104 may be retained by the frame 102. Although FIG. 1 shows the pair of optical device lenses 104 retained by the frame 102, the pair of optical device lenses 104 are not limited to the frame 102. For example, other means for retaining the pair of optical device lenses 104 may be utilized, such as with alternate frame shapes, other devices such as a head-mounted display (HMD) or other wearable display devices that have near-eye display panels as lenses, to display a virtual or augmented reality environment.

FIGS. 2A-2E are schematic, cross-sectional views of lens stacks 200A-200E. The pair of optical device lenses 104 (shown in FIG. 1) each include one of the lens stacks 200A-200E. The lens stacks 200A-200E are retained by the frame 102 (shown in FIG. 1). The lens stacks 200A-200E reduce the total weight of the pair of the optical device lenses 104 (shown in FIG. 1). For example, the usage of metasurfaces will significantly reduce the weight of the optical device lenses compared to bulk lens usage. Additionally, integrating the prescription lenses into the optical device lenses 104 will improve the functionality of the glasses 100. Users who need prescription lenses will be able to use the glasses 100 more comfortably and functionally. The stacking of lenses will be aligned as needed during manufacturing. As such, post alignment processes to align the multiple lenses will not be required. Therefore, a decrease in manufacturing time and cost will be achieved.

Figure 2A:
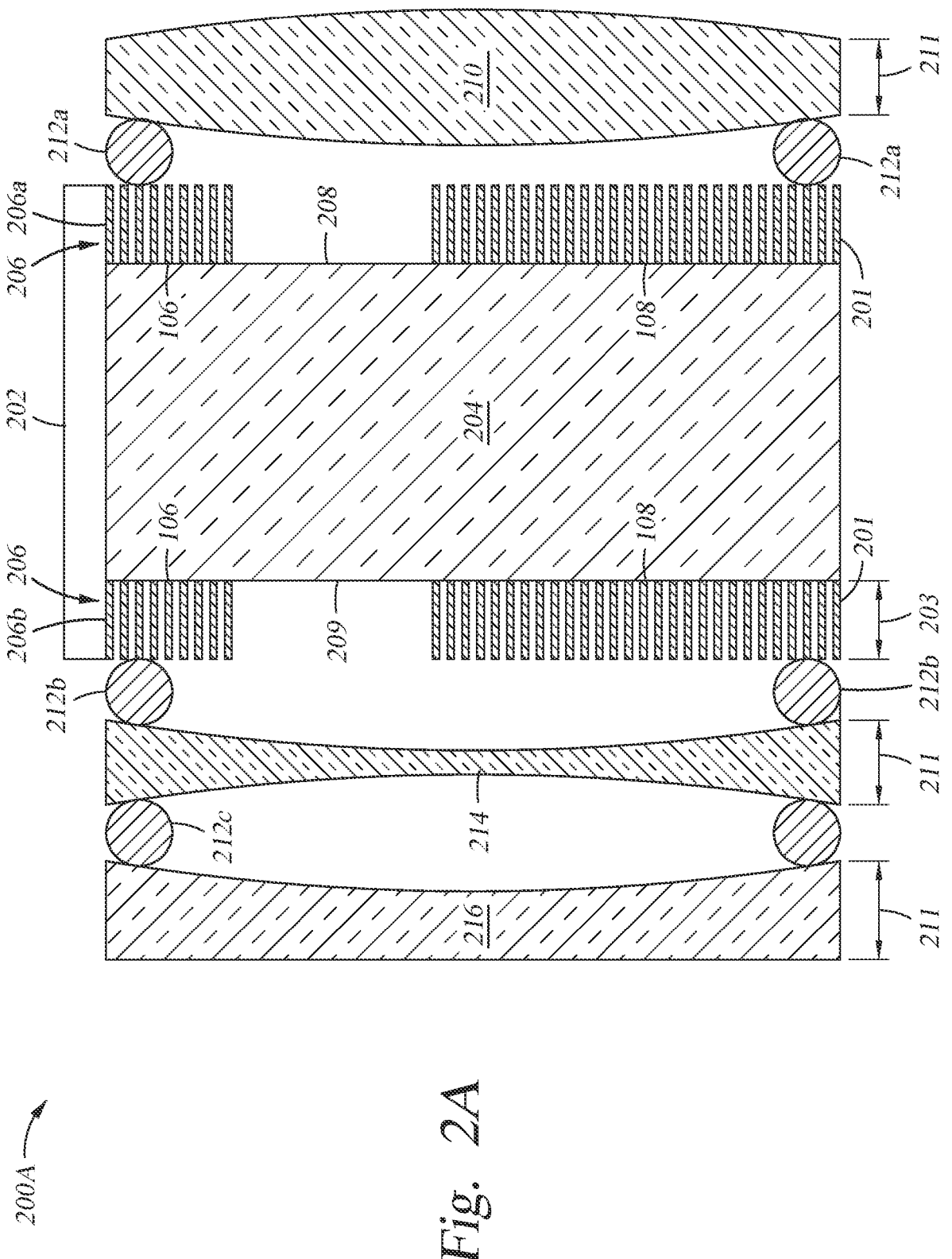
FIGS. 2A-2E are schematic, cross-sectional views of a lens stack according to embodiments.

FIG. 2A is a schematic, cross-sectional view of a lens stack 200A. The lens stack 200A includes a waveguide combiner 202, a convex lens 210, and a concave lens 214. The waveguide combiner 202 assists in overlaying virtual images on ambient environments. The waveguide combiner 202 includes a waveguide substrate 204 and one or more gratings 206 (i.e., first grating 206a and second grating 206b). The lens stack 200A is operable to be sensitive to one or more wavelengths corresponding to at least one of red, green, or blue light. Substrate selection may include substrates of any suitable material, including, but not limited to, amorphous dielectrics, non-amorphous dielectrics, crystalline dielectrics, silicon oxide, polymers, or combinations thereof. In some embodiments, which may be combined with other embodiments described herein, the waveguide substrate 204 includes a transparent material. Suitable examples may include an oxide, sulfide, phosphide, telluride or combinations thereof. In one example, the waveguide substrate 204 includes silicon (Si), silicon dioxide (SiO$_2$), fused silica, quartz, silicon carbide (SiC), germanium (Ge), silicon germanium (SiGe), indium phosphide (InP), gallium arsenide (GaAs), gallium nitride (GaN), or sapphire, and high-index transparent materials such as high-refractive-index glass, or combinations thereof.

One or more of the first gratings 206a are disposed on a first surface 208 of the waveguide substrate 204. One or more of the second gratings 206b are disposed on a second surface 209 of the waveguide substrate 204. In one embodiment, which can be combined with other embodiments described herein, each of the one or more gratings 206, such as the first gratings 206a and the second gratings 206b, correspond to one of the image incoupler 106, the image outcoupler 108, or an intermediate grating (not shown). The lens stack 200A includes the image incoupler 106 and the image outcoupler 108.

The one or more gratings 206 are each a region of optical device structures 201. The plurality of optical device structures 201 are nanostructures having sub-micron dimensions. Although the optical device structures 201 shown are binary, the optical device structures 201 may be angled relative to the first surface 208 of the waveguide substrate 204 and the second surface 209. For example, the optical device structures 201 may be at an angle from 15° to about 85°. The optical device structures 201 may vary in height 203 along the waveguide substrate 204. The optical device structures 201 include, but are not limited to, one or more of silicon oxycarbide (SiOC), titanium dioxide (TiO$_2$), silicon dioxide (SiO$_2$), vanadium (IV) oxide (VOx), aluminum oxide (Al$_2$O$_3$), aluminum-doped zinc oxide (AZO), indium tin oxide (ITO), tin dioxide (SnO$_2$), zinc oxide (ZnO), tantalum pentoxide (Ta$_2$O$_5$), silicon nitride (Si$_3$N$_4$), zirconium dioxide (ZrO$_2$), niobium oxide (Nb$_2$O$_5$), cadmium stannate (Cd$_2$SnO$_4$), silicon carbon-nitride (SiCN) containing materials, or combinations thereof.

The convex lens 210 is coupled to the first gratings 206a. The convex lens 210 is coupled to the first gratings 206a via a first pair of spacers 212a. The convex lens 210 allows for a real image to be focused in a user's retina. The lens stack 200a further includes the concave lens 214. The concave lens 214 is coupled to the second gratings 206b. The concave lens 214 is coupled to the second gratings 206b via a second pair of spacers 212b. The concave lens 214 is utilized to bring the virtual images nearer to the user's retina. For example, the concave lens 214 brings the virtual images between about 0.2 m to about 3 m of the user's retina. In one embodiment, which can be combined with other embodiments described herein, the lens stack 200A includes a prescription lens 216. The prescription lens 216 is coupled to the concave lens 214. The prescription lens 216 is coupled to the concave lens 214 via a third pair of spacers 212c. The prescription lens 216 may be optionally included in the lens stack 200A, depending if the user requires the prescription lens 216. In one embodiment, which can be combined with other embodiments described herein, the first pair of spacers 212a, the second pair of spacers 212b, and the third pair of spacers 212c include a polystyrene material. In some embodiments, which can be combined with other embodiments described herein, the first pair of spacers 212a, the second pair of spacers 212b, and the third pair of spacers 212c are an adhesive material.

Figure 2B:
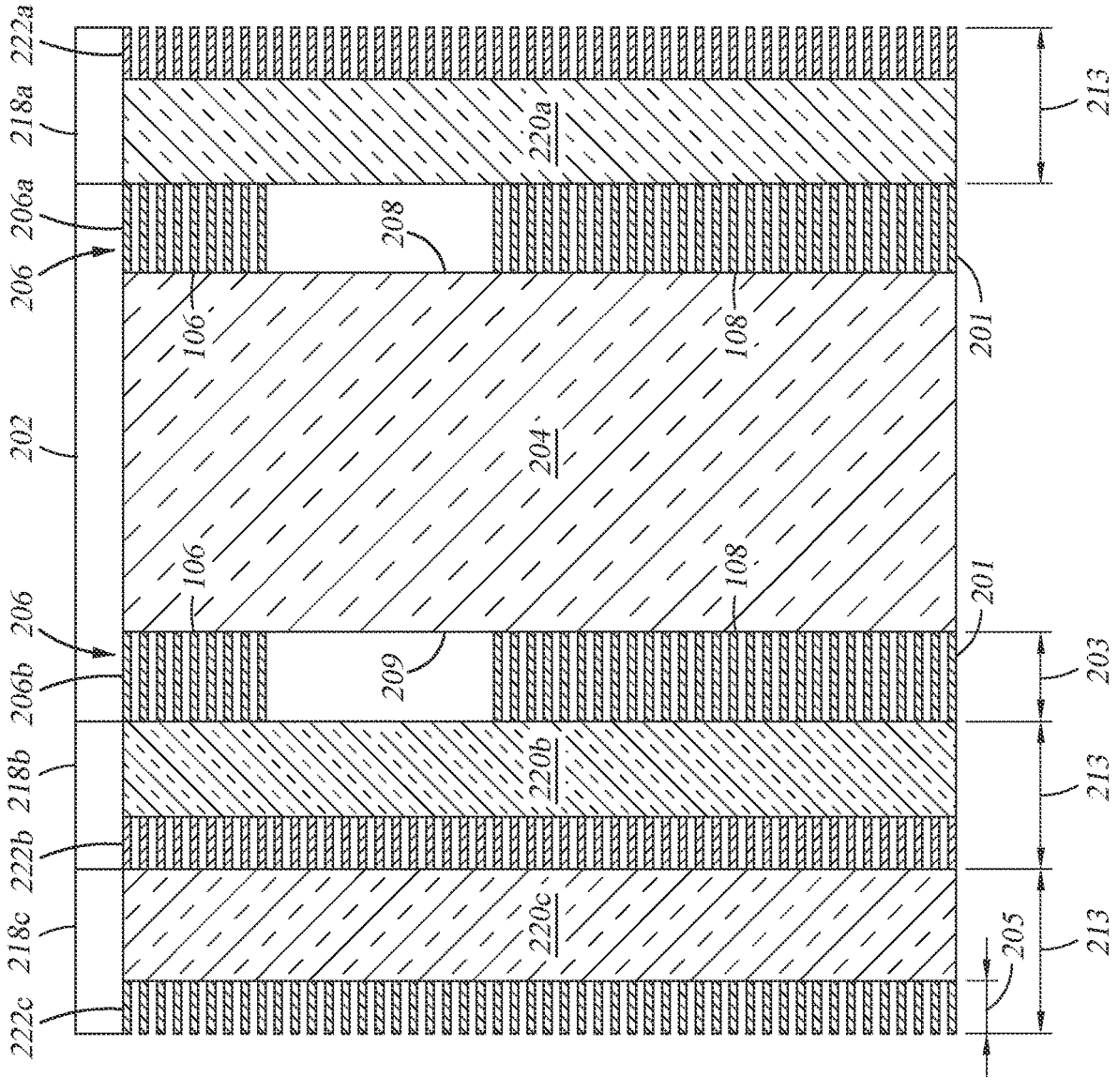

FIG. 2B is a schematic, cross-sectional view of a lens stack 200B. The lens stack 200B includes a waveguide combiner 202, a first metasurface 218a, and a second metasurface 218b. The waveguide combiner 202 includes a waveguide substrate 204 and one or more gratings 206 (i.e., first grating 206a and second grating 206b). The lens stack 200B is operable to be sensitive to one or more wavelengths corresponding to at least one of red, green, or blue light. One or more first gratings 206a are disposed on a first surface 208 of the waveguide substrate 204. One or more second gratings 206b are disposed on a second surface 209 of the waveguide substrate 204. The lens stack 200A includes the image incoupler 106 and the image outcoupler 108.

The first metasurface 218a is coupled to the first gratings 206a. The first metasurface 218a allows for a real image to be focused in a user's retina. The lens stack 200B further includes a second metasurface 218b. The second metasurface 218b is coupled to the second gratings 206b. The second metasurface 218b is utilized to bring the virtual images nearer to the user's retina. For example, the second metasurface 218b brings the virtual images between about 0.2 m to about 3 m of the user's retina. In one embodiment, which can be combined with other embodiments described herein, the lens stack 200B includes a third metasurface 218c. The third metasurface 218c is a prescription lens or prescription metasurface. The third metasurface 218c is coupled to the second metasurface 218b. The third metasurface 218c may be optionally included in the lens stack 200B, depending if the user needs a prescription lens or prescription metasurface.

The first metasurface 218a, the second metasurface 218b, and the third metasurface 218c are flat optical devices; therefore, the first metasurface 218a, the second metasurface 218b, and the third metasurface 218c have a thickness less than the thickness of the concave lens 214, the convex lens 210, and the prescription lens 216 of the lens stack 200A.

In one embodiment, which can be combined with other embodiments described herein, a curing process couples the metasurfaces 218a-218c and the waveguide combiner 202 of the lens stack 200B together. For example, an ultraviolet (UV) light sensitive glue may be used to couple the metasurfaces 218a-218c and waveguide combiner 202 of the lens stack 200B together during the curing process.

The first metasurface 218a includes a first substrate 220a. The first substrate 220a is coupled to the first gratings 206a. The first metasurface 218a further includes a first plurality of optical device structures 222a disposed on the first substrate 220a. The second metasurface 218b includes a second substrate 220b. The second substrate 220b is coupled to the second gratings 206b. The second metasurface 218b further includes a second plurality of optical device structures 222b disposed on the second substrate 220b. The third metasurface 218c includes a third substrate 220c. The third substrate 220c is coupled to the second plurality of optical device structures 222b. The third metasurface 218c further includes a third plurality of optical device structures 222c disposed on the third substrate 220c.

Substrate selection of the first substrate 220a, the second substrate 220b, and the third substrate 220c may include substrates of any suitable material, including, but not limited to, amorphous dielectrics, non-amorphous dielectrics, crystalline dielectrics, silicon oxide, polymers, or combinations thereof. In some embodiments, which may be combined with other embodiments described herein, the first substrate 220a, the second substrate 220b, and the third substrate 220c include a transparent material. Suitable examples may include an oxide, sulfide, phosphide, telluride or combinations thereof. In one example, the first substrate 220a, the second substrate 220b, and the third substrate 220c include silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), or sapphire, and high-index transparent materials such as high-refractive-index glass, or combinations thereof. Each of the first substrate 220a, the second substrate 220b, and the third substrate 220c may include a different material. The first plurality of optical device structures 222a, the second plurality of optical device structures 222b, and the third plurality of optical device structures 222c include, but are not limited to, one or more of silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), silicon carbon-nitride (SiCN) containing materials, or combinations thereof. Each of the first plurality of optical device structures 222a, the second plurality of optical device structures 222b, and the third plurality of optical device structures 222c may include different materials.

Although the first plurality of optical device structures 222a, the second plurality of optical device structures 222b, and the third plurality of optical device structures 222c shown are binary, the optical device structures may be angled. For example, the first plurality of optical device structures 222a, the second plurality of optical device structures 222b, and the third plurality of optical device structures 222c may be at an angle from 15° to about 85°. The first plurality of optical device structures 222a, the second plurality of optical device structures 222b, and the third plurality of optical device structures 222c may vary in a height 205 along the first substrate 220a, the second substrate 220b, and the third substrate 220c.

Figure 2C:
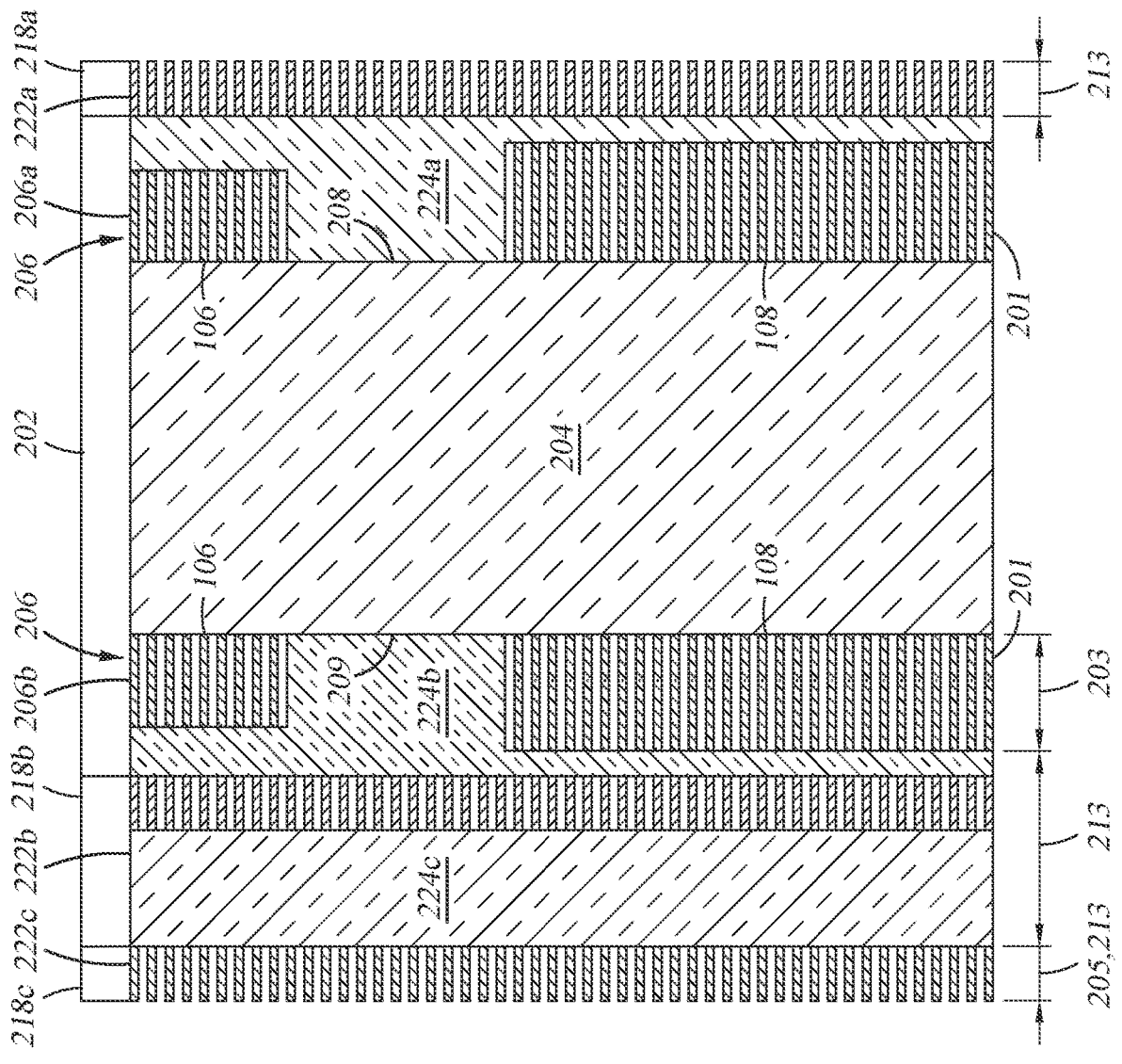

FIG. 2C is a schematic, cross-sectional view of a lens stack 200C. The lens stack 200C is a variation of the lens stack 200B. The lens stack 200C includes the waveguide combiner 202. The waveguide combiner 202 includes the waveguide substrate 204 and the one or more gratings 206. A first encapsulation layer 224a is disposed over the first gratings 206a. A second encapsulation layer 224b is disposed over the second gratings 206b. The first encapsulation layer 224a and the second encapsulation layer 224b provide protection for the waveguide combiner 202.

The lens stack 200C includes the first metasurface 218a. The first metasurface 218a is coupled to the first encapsulation layer 224a. The lens stack 200C further includes the second metasurface 218b. The second metasurface 218b is coupled to the second encapsulation layer 224b. In one embodiment, which can be combined with other embodiments described herein, the lens stack 200C includes the third metasurface 218c. The third metasurface 218c is a prescription lens or metasurface. The third metasurface 218c is coupled to the second metasurface 218b. The third metasurface 218c may be optionally included in the lens stack 200C, depending if the user requires a prescription lens or prescription metasurface. In one embodiment, which can be combined with other embodiments described herein, a curing process couples the metasurfaces 218a-218c and the waveguide combiner 202 of the lens stack 200C together. For example, an ultraviolet (UV) light sensitive glue may be used to couple the metasurfaces 218a-218c and waveguide combiner 202 of the lens stack 200C together during a curing process.

The first metasurface 218a includes a first plurality of optical device structures 222a disposed on the first encapsulation layer 224a. The second metasurface 218b includes a second plurality of optical device structures 222b disposed on the second encapsulation layer 224b. In embodiments where the third metasurface 218c is employed, the second metasurface 218b may include a third encapsulation layer 224c. The third encapsulation layer 224c is disposed over the second plurality of optical device structures 222b. The third metasurface 218*c* includes a third plurality of optical device structures 222*c* disposed on the third encapsulation layer 224*c*.

The first encapsulation layer 224*a*, the second encapsulation layer 224*b*, and the third encapsulation layer 224*c* include SiN, low-k, SiOC, SiCONH, SiO, PSG, BPSG, TaO or TiN materials, or combinations thereof. The first encapsulation layer 224*a*, the second encapsulation layer 224*b*, and the third encapsulation layer 224*c* provide mechanical support for the plurality of optical device structures 222*a*-222*c* disposed thereon. The first encapsulation layer 224*a*, the second encapsulation layer 224*b*, and the third encapsulation layer 224*c* allow for improved manufacture time and cost compared to utilizing substrates for the metasurfaces.

Figure 2D:
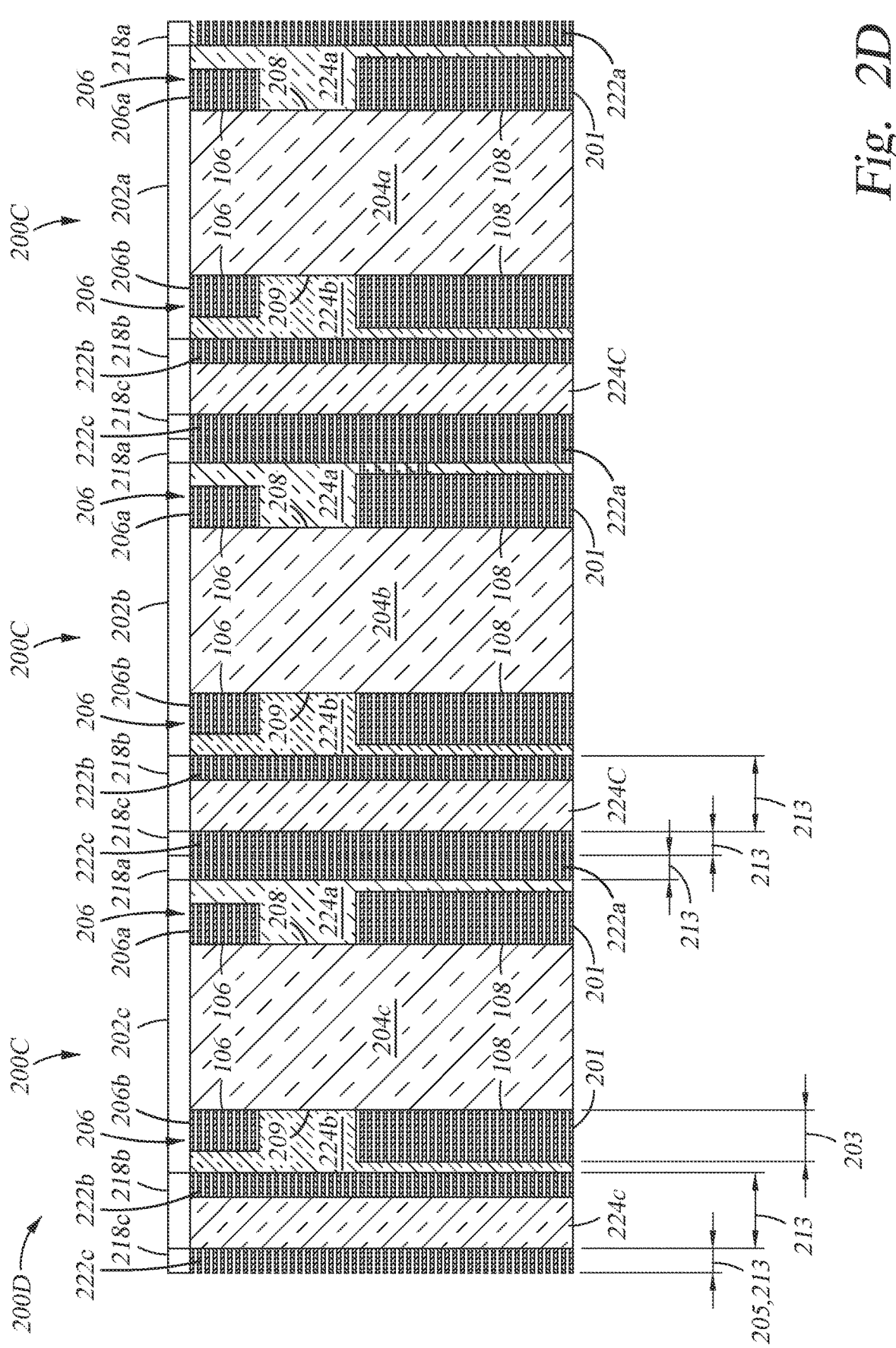

FIG. 2D is a schematic, cross-sectional view of a lens stack 200D. The lens stack 200D includes multiple lens stacks 200C coupled together. For example, lens stack 200C with a first waveguide combiner 202*a* is coupled to a separate lens stack 200C with a second waveguide combiner 202*b* which is coupled to a separate lens stack 200C with a third waveguide combiner 202*c*. The first waveguide combiner 202*a*, the second waveguide combiner 202*b*, and the third waveguide combiner 202*c* are to be sensitive to one or more wavelengths corresponding to at least one of red, green, or blue light. For example, the first waveguide combiner 202*a* is sensitive to red light, the second waveguide combiner 202*b* is sensitive to green light, and the third waveguide combiner 202*c* is sensitive to blue light. Therefore, the lens stack 200D is operable to be sensitive to wavelengths corresponding to red, green, and blue light.

In one embodiment, which can be combined with other embodiments described herein, the lens stacks 200C are coupled together such that a first metasurface 218*a* of the lens stack 200C is coupled to a third metasurface 218*c* of an adjacent lens stack 200C. In another embodiment, which can be combined with other embodiments described herein, where prescription lenses or metasurfaces are not required, the third metasurface 218*c* of the lens stack 200C is removed such that adjacent lens stacks 200C are coupled together with the first metasurface 218*a* of the lens stack 200C coupled to a second metasurface 218*b* of an adjacent lens stack 200C.

Figure 2E:
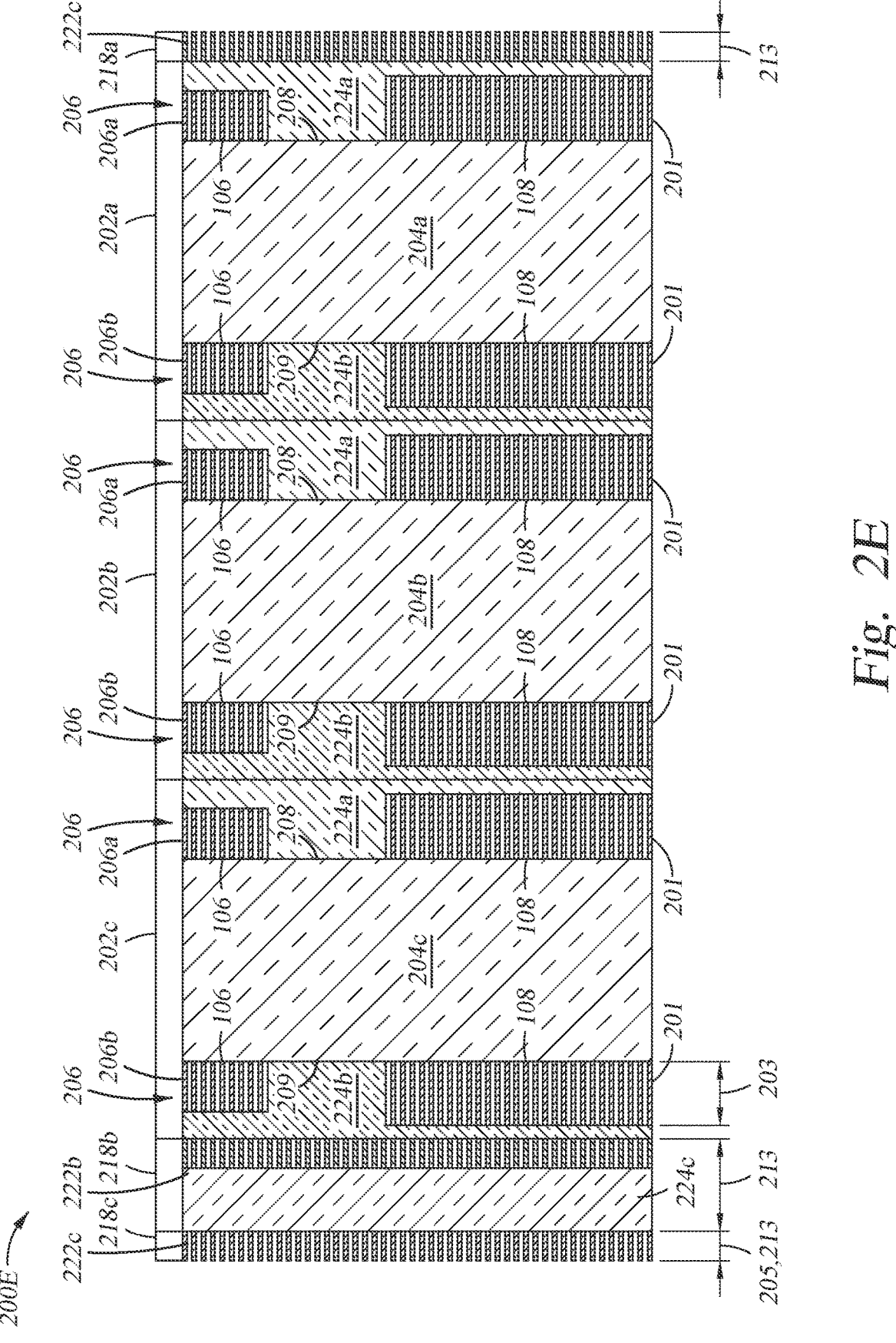

FIG. 2E is a schematic, cross-sectional view of a lens stack 200E. The lens stack 200E includes a first waveguide combiner 202*a*, a second waveguide combiner 202*b*, and a third waveguide combiner 202*c*. The first waveguide combiner 202*a*, the second waveguide combiner 202*b*, and the third waveguide combiner 202*c* assist in overlaying virtual images on ambient environments. The first waveguide combiner 202*a*, the second waveguide combiner 202*b*, and the third waveguide combiner 202*c* are operable to be sensitive to one or more wavelengths corresponding to at least one of red, green, or blue light. For example, the first waveguide combiner 202*a* is sensitive to red light, the second waveguide combiner 202*b* is sensitive to green light, and the third waveguide combiner 202*c* is sensitive to blue light. Therefore, the lens stack 200E is operable to be sensitive to wavelengths corresponding to red, green, and blue light.

The first waveguide combiner 202*a* includes a first waveguide substrate 204*a*. The second waveguide combiner 202*b* includes a second waveguide substrate 204*b*. The third waveguide combiner 202*c* includes a third waveguide substrate 204*c*. The first waveguide substrate 204*a* includes one or more first gratings 206*a* on a first surface 208. The first waveguide substrate 204*a* includes one or more second gratings 206*b* on a second surface 209. The second waveguide substrate 204*b* includes the first gratings 206*a* on the first surface 208. The second waveguide substrate 204*b* includes the second gratings 206*b* on the second surface 209. The third waveguide substrate 204*c* includes the first gratings 206*a* on the first surface 208. The third waveguide substrate 204*c* includes the second gratings 206*b* on the second surface 209.

The first gratings 206*a* include a first encapsulation layer 224*a* disposed thereover. The second gratings 206*b* include a second encapsulation layer 224*b* disposed thereover. The first encapsulation layers 224*a* and the second encapsulation layers 224*b* provide protection for the first waveguide combiner 202*a*, the second waveguide combiner 202*b*, and the third waveguide combiner 202*c*.

The lens stack 200E includes a first metasurface 218*a*. The first metasurface 218*a* is coupled to the first encapsulation layer 224*a* of the first waveguide combiner 202*a*. The first metasurface 218*a* allows for a real image to be focused in a user's retina. The lens stack 200E further includes a second metasurface 218*b*. The second metasurface 218*b* is coupled to the second encapsulation layer 224*b* of the third waveguide combiner 202*c*. The second metasurface 218*b* is utilized to bring the virtual images nearer to the user's retina. For example, the second metasurface 218*b* brings the virtual images between about 0.2 m to about 3 m of the user's retina. In one embodiment, which can be combined with other embodiments described herein, the lens stack 200E includes a third metasurface 218*c*. The third metasurface 218*c* is a prescription lens or metasurface. The third metasurface 218*c* is coupled to the second metasurface 218*b*. The third metasurface 218*c* may be optionally included in the lens stack 200E, depending if the user requires a prescription lens or prescription metasurface. The first metasurface 218*a*, the second metasurface 218*b*, and the third metasurface 218*c* are flat optical devices; therefore, the first metasurface 218*a*, the second metasurface 218*b*, and the third metasurface 218*c* have a metasurface thickness 213 less than a lens thickness 211 of the concave lens 214, the convex lens 210, and the prescription lens 216 of the lens stack 200A. In one embodiment, which can be combined with other embodiments described herein, a curing process couples the metasurfaces 218*a*-218*c* and the waveguide combiners 202*a*-202*c* of the lens stack 200E together. For example, an ultraviolet (UV) light sensitive glue may be used to couple the metasurfaces 218*a*-218*c* and waveguide combiners 202*a*-202*c* of the lens stack 200E together during a curing process.

The first metasurface 218*a* includes a first plurality of optical device structures 222*a* disposed on the first encapsulation layer 224*a*. The second metasurface 218*b* includes a second plurality of optical device structures 222*b* disposed on the second encapsulation layer 224*b*. In embodiments where the third metasurface 218*c* is required, the second metasurface 218*b* may include a third encapsulation layer 224*c*. The third encapsulation layer 224*c* is disposed over the second plurality of optical device structures 222*b*. The third metasurface 218*c* includes a third plurality of optical device structures 222*c* disposed on the third encapsulation layer 224*c*. The first encapsulation layer 224*a*, the second encapsulation layer 224*b*, and the third encapsulation layer 224*c* provide mechanical support for the plurality of optical device structures 222*a*-222*c* disposed thereon. The first encapsulation layer 224*a*, the second encapsulation layer 224*b*, and the third encapsulation layer 224*c* in place of the first substrate 220*a*, the second substrate 220*b*, and the third substrate 220*c* of FIG. 2B allows for improved manufacture time and cost.

In summation, augmented reality and virtual reality glasses having stacked lenses are described herein. The augmented reality (AR) and virtual reality (VR) glasses include a pair of lenses retained by a frame. In order to decrease the weight of traditional AR/VR glasses, a lens stack may be utilized in the pair of lenses. In addition to a waveguide combiner, used to assist in overlaying virtual images on ambient environments, the lens stack may include multiple metasurfaces that improve the focus adjustment for both the real and virtual images as well as the option to include a prescription lens or prescription metasurface in the lens stack. By utilizing a lens stack, the total weight of the glasses will decrease. Additionally, removal of a post alignment process to align the multiple lenses will decrease manufacturing time and cost.

While the foregoing is directed to examples of the present disclosure, other and further examples of the disclosure may be devised without departing from the basic scope thereof, and the scope thereof is determined by the claims that follow.

What is claimed is:

1. An optical device comprising:
a waveguide combiner, the waveguide combiner including:
one or more first gratings disposed on a first surface of a substrate; and
one or more second gratings disposed on a second surface of the substrate;
a convex lens coupled to the one or more first gratings with a first pair of spacers;
a concave lens coupled to the one or more second gratings with a second pair of spacers; and
a prescription lens coupled to the concave lens with a third pair of spacers.

2. The optical device of claim 1, wherein the one or more first gratings and the one or more second gratings include a plurality of optical device structures.

3. The optical device of claim 2, wherein the plurality of optical device structures are nanostructures having submicron dimensions.

4. The optical device of claim 2, wherein the plurality of optical device structures are binary or angled relative to the first surface of the substrate and the second surface of the substrate.

5. The optical device of claim 4, wherein the plurality of optical device structures comprise an angle of 15 degrees to 85 degrees.

6. The optical device of claim 2, wherein the optical device structures comprise silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), silicon carbon-nitride (SiCN) containing materials, or combinations thereof.

7. The optical device of claim 1, wherein:
the one or more first gratings include a first image incoupler and a first image outcoupler; and
the one or more second gratings include a second image incoupler and a second image outcoupler.

8. The optical device of claim 1, wherein the first pair of spacers and the second pair of spacers include a polystyrene material or an adhesive material.

9. The optical device of claim 1, wherein the substrate comprises silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), or sapphire or combinations thereof.

10. The optical device of claim 1, wherein the convex lens is operable to focus a real image on a user's retina.

11. The optical device of claim 1, wherein the concave lens is operable to bring a virtual image nearer to a user's retina.

12. The optical device of claim 11, wherein the concave lens is operable to bring the virtual image about 0.2 m to about 3 m of the user's retina.

13. An optical device comprising:
a waveguide combiner, the waveguide combiner comprising:
an image incoupler comprising a plurality of optical device structures and an image outcoupler comprising the plurality of optical device structures disposed over a first surface of a substrate; and
a convex lens coupled to the waveguide combiner with a first pair of spacers disposed over the first surface; and
a concave lens coupled to the waveguide combiner with a second pair of spacers disposed over a second surface of the substrate; and a prescription lens coupled to the concave lens with a third pair of spacers.

14. The optical device of claim 13, wherein the plurality of optical device structures comprise silicon oxycarbide (SiOC), titanium dioxide ($TiO_2$), silicon dioxide ($SiO_2$), vanadium (IV) oxide (VOx), aluminum oxide ($Al_2O_3$), aluminum-doped zinc oxide (AZO), indium tin oxide (ITO), tin dioxide ($SnO_2$), zinc oxide (ZnO), tantalum pentoxide ($Ta_2O_5$), silicon nitride ($Si_3N_4$), zirconium dioxide ($ZrO_2$), niobium oxide ($Nb_2O_5$), cadmium stannate ($Cd_2SnO_4$), silicon carbon-nitride (SiCN) containing materials, or combinations thereof.

15. The optical device of claim 13, wherein the plurality of optical device structures are binary or angled relative to the first surface of the substrate and the second surface of the substrate.

16. The optical device of claim 15, wherein the plurality of optical device structures comprise an angle of 15 degrees to 85 degrees.

17. An optical device comprising:
a waveguide combiner, the waveguide combiner including:
an image incoupler comprising a plurality of optical device structures and an image outcoupler comprising the plurality of optical device structures disposed over a first surface of a substrate; and
a convex lens coupled to the waveguide combiner with a first pair of spacers disposed over the first surface; and
a concave lens coupled to the waveguide combiner with a second pair of spacers disposed over a second surface of the substrate; and
a prescription lens coupled to the concave lens with a third pair of spacers.

18. The optical device of claim 17, wherein the substrate comprises silicon (Si), silicon dioxide ($SiO_2$), fused silica, quartz, silicon carbide (SiC), germanium (Ge), silicon germanium (SiGe), indium phosphide (InP), gallium arsenide (GaAs), gallium nitride (GaN), or sapphire or combinations thereof.

19. The optical device of claim 17, wherein the first pair of spacers and the second pair of spacers include a polystyrene material or an adhesive material.

* * * * *